M. J. HUGGINS.
SPEED CONTROLLING MECHANISM FOR AUTOMOBILES.
APPLICATION FILED NOV. 30, 1915.
1,316,954.
Patented Sept. 23, 1919.
2 SHEETS—SHEET 2.
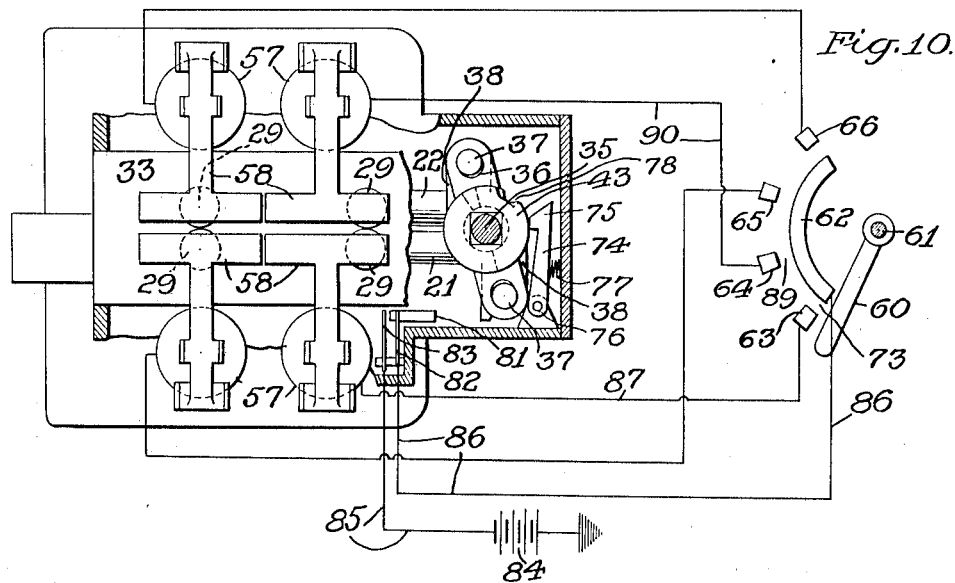
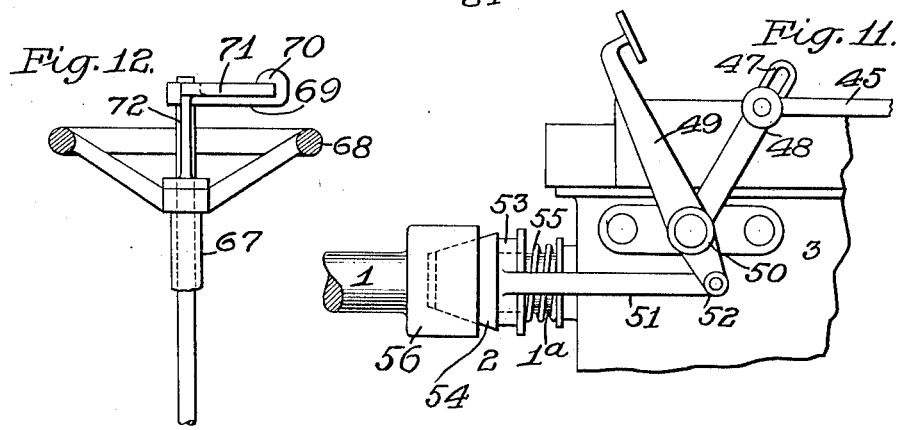
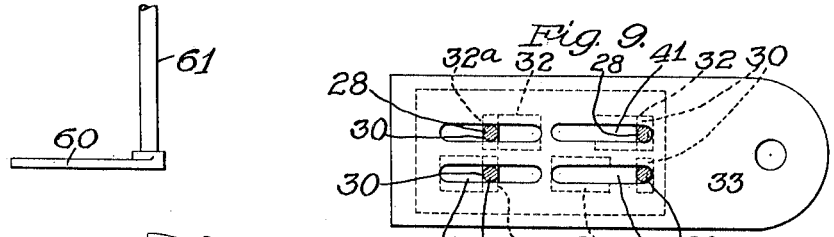
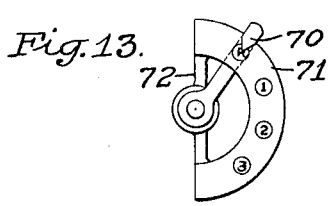

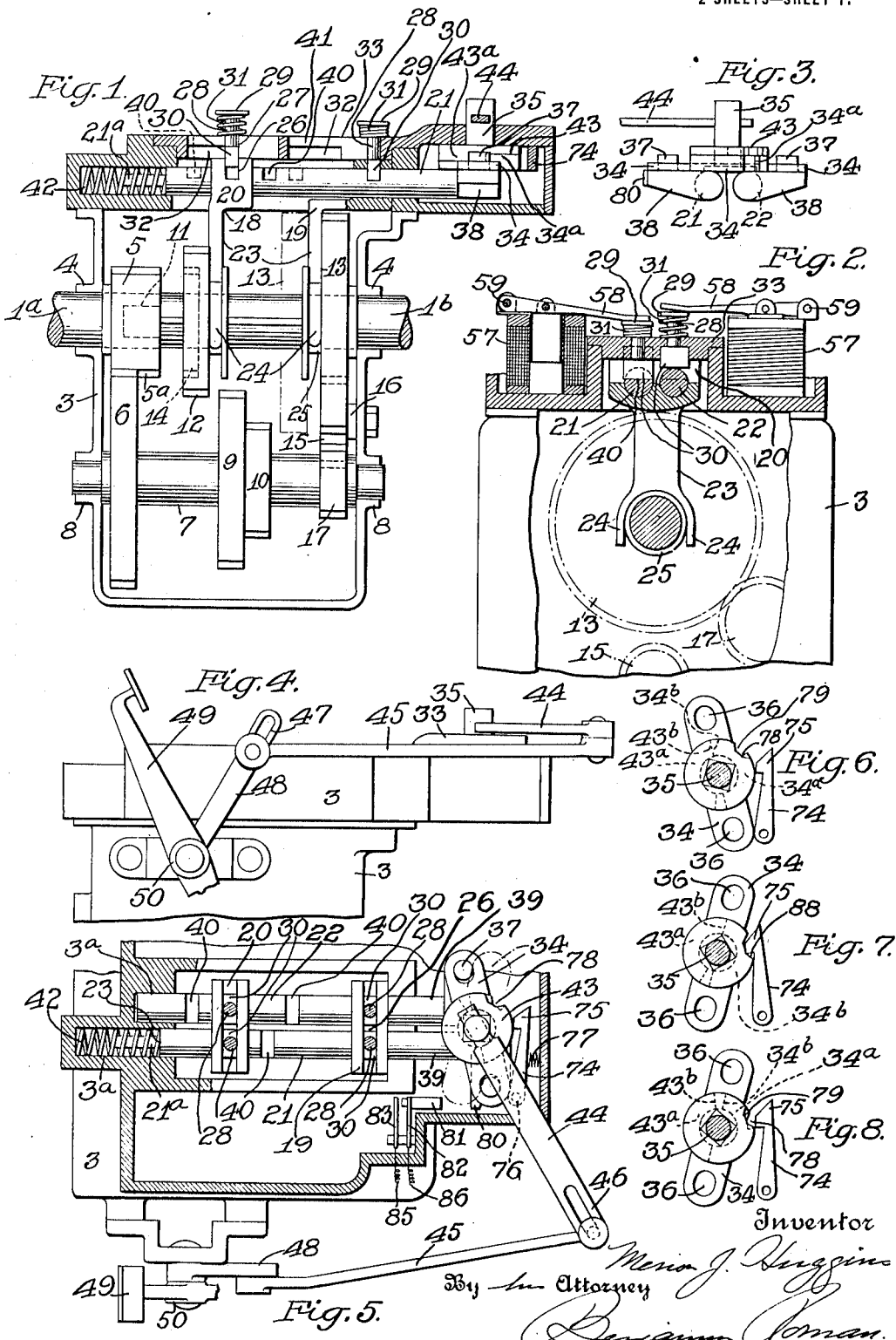

UNITED STATES PATENT OFFICE.

MERION J. HUGGINS, OF NEW YORK, N. Y., ASSIGNOR TO AUTOMOTIVE DEVELOPMENT CO., INC., OF NEW YORK, N. Y., A CORPORATION OF NEW YORK.

SPEED-CONTROLLING MECHANISM FOR AUTOMOBILES.

1,316,954.      Specification of Letters Patent.      Patented Sept. 23, 1919.

Application filed November 30, 1915. Serial No. 64,298.

*To all whom it may concern:*

Be it known that I, MERION J. HUGGINS, a citizen of the United States, and resident of the city of New York, in the county of Kings and State of New York, have invented certain new and useful Improvements in Speed-Controlling Mechanism for Automobiles, of which the following is a specification.

This invention relates to automobiles, particularly to the speed controlling mechanism thereof, and its principal object is to provide simple, efficient, reliable, and improved means for controlling the speed of the automobile, and for driving the automobile wheels at a variable speed relatively to the speed of the engine or prime mover.

Another object is to provide improved, conveniently operated, and readily responsive means for controlling the changing of the speeds and reversing of the wheels.

Other objects and advantages will hereinafter appear.

In the accompanying drawings,—

Figure 1 is a general view, partly in section and partly in full, showing an elevation of an automobile gear transmission, to which the invention is here shown as adapted, with the operating mechanism therefor.

Fig. 2 is an end elevation, partly in section and partly in full, of the gearing and mechanism shown in Fig. 1.

Fig. 3 is an end elevation of a portion of the mechanism shown in Fig. 1.

Fig. 4 is an elevation showing portions of the gear-transmission operating-mechanism.

Fig. 5 is a plan view of the mechanism shown in Figs. 1 and 4.

Figs. 6, 7, and 8 are detail views illustrating the operation of parts of the mechanism.

Fig. 9 is a plan view of a detail of the mechanism.

Fig. 10 is a plan view showing portions of the operating mechanism and a diagram of the electric circuits in connection therewith.

Fig. 11 is an elevation of the clutch for the engine drive-shaft.

Fig. 12 shows an elevation of a device for closing said circuits, and an indicator for the circuits.

Fig. 13 is a plan view of the indicator shown in Fig. 12.

A shaft 1, driven by the automobile engine not shown, drives a section $1^a$ thereof, which is split therefrom at clutch 2, Fig. 11, and extends to the gear-casing 3, Fig. 1, where it is mounted in bearings 4 of said casing. The shaft-section $1^a$ carries a wide gear 5 which drives a gear 6 that is keyed upon and drives a counter-shaft 7 mounted in bearings 8 of said casing. Said counter-shaft carries drive gears 9 and 10 of different sizes, and the rear shaft-section $1^b$ of the drive shaft, split from shaft-section $1^a$ at 11 and running independently thereof, carries coöperating transmission gears 12 and 13 splined to shift thereupon, so that any one of said transmission gears may be caused to mesh with and unmesh from its coöperating drive gear on said counter-shaft, and various speeds may be thereby transmitted to the shaft $1^b$, which in turn drives the wheels of the automobile, not shown, at various speeds. Thus when the gears 12, 13 are unmeshed, the countershaft 7 driven by gears 5, 6 from shaft section $1^a$ runs idly and no motion is transmitted to the shaft-section $1^b$, and when the gears 13, 10 are meshed a slow speed is imparted to the shaft-section $1^b$. Likewise, when the gears 12, 9 are meshed a higher speed is transmitted to the shaft $1^b$, and when the gear 12 having an internal gear 14 is shifted to mesh the internal gear with the portion $5^a$ of wide gear 5 the shaft-section $1^b$ is driven at highest speed, directly from shaft-section $1^a$. In order to rotate the shaft $1^b$ oppositely for reversing the automobile wheels, the gear 13 is meshed with an intermediate idler-gear 15, which is mounted on a stud 16 fixed to casing 3 and is driven by a drive gear 17 carried upon the countershaft 7. The gears are meshed and unmeshed by means of shifting devices 18, 19 which comprise hubs 20 carried upon rods 21, 22 mounted in guiding ways $3^a$ of casing 3, arms 23 extending from said hubs, and forked portions 24 at the extremities of said arms that embrace shouldered collars 25 of the shiftable gears.

Within a notch 26 in the hub 20 of each shifting device is carried a pair of locking latches 27, each of which consists of a pin 28 having a flange 29 and a flattened portion 30 the lower part of which is located within the notch 26. And normally a spring 31 surrounding each of said pins presses against its flange 29 and lodges the upper part of its portion 30 within a receiving recess 32 formed in a plate 33 secured to the casing 3, whereby the shifting device is firmly maintained locked and shifting thereof is prevented while the gear carried thereby is maintained locked in unmeshed state. The latch 27 opposite rod 21 bears against edge 32ᵃ of its recess 32 to prevent movement of its shifting device and gear carried thereby toward the right, and the adjacent latch of the same device bears against the edge 32ᵃ of its recess 32 to prevent movement of the gear toward the left. The rods 21, 22 are parallel to each other and each is shiftable longitudinally toward the left and toward the right, as viewed in the drawing, through the guiding ways 3ᵃ and through the hubs 20 of the shifting devices 18, 19. A link-plate 34 pivoted centrally upon a stud 35 which in turn is pivotally mounted in the plate 33 is provided at its ends with elongated openings 36 which fit over pins 37 projecting upwardly from wings 38 which extend rightangularly from the extremities 39 of the rods 21, 22. Upon swinging or oscillating of the connecting link 34 about its pivot, from the position shown in Fig. 5 to that shown by the dash and dot lines, and back, a stroke may be simultaneously imparted to both of said rods, whereby the one designated 21 will move first forwardly toward the left and then backwardly toward the right to the initial position shown, while the rod 22 will simultaneously perform its stroke oppositely, first forwardly toward the right and then backwardly toward the left to initial position. In each of the rods 21, 22 are formed notches 40 which register with the latches 27 when said rods are at the termination of the forward portion of their simultaneous stroke, and upon pressing down any one of the latches 27, contrary to spring 31, toward the rod opposite thereto, just before said rods are shifted or just before they have completed the forward portion of their stroke, the upper part of its flat portion 30 is caused to leave its recess 32 in plate 33 and the lower part of this portion is compelled to enter its registering notch 40 in the rod, whereby the particular shifting device carrying said latch is thus unlocked from the plate 33 and locked firmly to the rod 21 or to the rod 22, depending upon which of the two latches 27 of the particular shifting device has been thus pressed. And hence, upon the backward portion of the simultaneous stroke of the rods 21, 22 said locked shifting device is carried along and shifted toward the right, as viewed in the drawing, if its latch 27 which is opposite the rod 21 has been previously pressed, but if its other latch 27 has been pressed and the shifting device thus locked to the rod 22 it is carried along by this rod in the opposite direction and shifted from neutral position toward the left, in which manner the gear carried by this shifting device can be shifted in opposite directions from a neutral position and meshed with either of its coöperating drive gears. Conversely, during the forward portion of a subsequent stroke of the rods 21, 22 the shifting device previously locked thereto is shifted back, toward the left or toward the right, depending upon whether the shifting device has been locked to the rod 21 or to the rod 22, and the spring 31 of the latch which was maintaining said device locked to the rod causes the latch-portion 30 to clear its notch 40 of the rod and to reënter its recess 32 in plate 33, whereby the shifting device is restored to initial or locked neutral position and the gear carried thereby is unmeshed. Upon the backward portion of the same subsequent simultaneous stroke of the rods 21, 22 they either return idly or together with the other shifting device or with the same shifting device, according to whichever of said devices has been locked to one or the other of said rods. During the movement of the shifting device both of its latches 27 are carried along therewith and the lower part of the flat portion 30 of that latch which has been pressed is maintained within its notch 40 of the rod by the plate 33 bearing upon the upper face of said flat portion 30, the pin 28 of said latch being meanwhile retained within an elongated slot 41 in plate 33, Figs. 1 and 9, and the other latch being meanwhile permitted to travel along idly with the moving shifting-device by having its pin 28 retained within a similar slot 41 and the upper part of its flat portion 30 traveling within its recess 32, which is made elongated as shown, to provide clearance therefor while it is traveling idly. The movement of the rods 21, 22 during the forward portion of their stroke simultaneously compresses a spring 42, which is located within guiding way 3ᵃ, surrounds the rod-end 21ᵃ, and is adapted to press against said rod-end and against the end of said guiding way. Upon releasing of the link 34, after having been swung to the position shown by the dash and dot lines, it permits the spring 42, which has been thus previously compressed, to shift the rod 21 back toward the right and consequently through the link 34, the rod 22 back toward the left, and incidentally said link is swung back in a counter-clockwise direction to the normal position shown. The link 34 is oscillated to actuate the rods 21, 22 by means of a circular cam 43, which is centrally mounted upon and fixed to the pivoted stud 35 and is partially rotated with said stud by a lever 44 fixed to the stud. When said cam is rotated in a clockwise direction a segmental thickened portion 43ᵃ thereof strikes a similar portion 34ᵃ of link 34 and thereby swings said link about its pivot. A link 45 connects the slotted end 46 of lever 44 with the slotted end 47 of an arm 48 secured to a pedal 49, which is fulcrumed therewith at a common pivot 50 and is utilized for operating the drive-shaft clutch 2. Upon pressing of the foot-pedal 49 to swing it toward the left and releasing it to permit its return swinging toward the right, in the operation of the clutch, the cam is thereby rotated partially in opposite directions to oscillate the link 34, to release it in the manner hereinafter seen, and, in conjunction with the action of spring 42, to move the rods 21, 22 to perform their simultaneous forward and backward stroke in the above described manner. Said pedal is connected to the clutch 2 by means of a bar 51 which is joined to the pedal-end 52 and carries a forked arm 53 that embraces the cone-portion 54 of the clutch. Pressing of the pedal 49 moves the cone portion 54 toward the right contrary to the pressure of clutch-spring 55 and disengages it from its coöperating clutch member 56 to unclutch the shaft-portions 1, 1ᵃ. Releasing of the pedal causes the spring 55 to engage the cone portion 54 with the member 56 to clutch the shaft-portions 1, 1ᵃ, and to simultaneously swing the pedal back toward the right to its normal position shown in the drawing.

A solenoid 57 is provided for each of the latches 27 which when energized causes its armature 58 hinged at 59 to press down upon the flange 29 of its latch contrary to the pressure of latch-spring 31. Said armature thereby compels the latch 27 to enter its registering rod-notch 40 and to lock its shifting device to the rod opposite thereto at the moment said rod reaches the termination of the forward portion of its stroke.

Circuits for the solenoids 57 are opened and closed by means of a current-conducting arm 60, which is fixed to a rocking rod 61 and may be swung therewith and about the arms thereof to contact it with a segmental terminal-plate 62 and any one of terminal contacts 63, 64, 65, and 66. The rod 61 extends from the arm 60, Fig. 12, through and outwardly from the steering column 67 of the machine, and is provided at its extremity above the steering wheel 68 with a lever 69 wherewith the rod may be rocked to swing the arm 60. A pointer 70 extends from the extremity of lever 69 and around the outer side of a segmental frame 71, which is concentric with the rod 61 and is secured to the column 67 by means of brackets 72. Upon the frame 71 are marked speed indications, such as "Reverse" or "R", "1st," "2nd", and "Direct" or "3rd", and the lever 69 with its pointer 70 may be swung to point to any one of said indications.

In the operation of the gear transmission the lever 69 may be set to point to any one of the indications upon indicator-frame 71, according to whichever coöperating pair of gears it is desired to mesh in the selection of speeds for the automobile wheels, and we will assume that said lever has been set to point to "R" or "Reverse" as shown. The arm 60 is thereby set to join the terminal-contact 63 with the terminal plate 62, and closes the break 73 of a branch circuit which when having current therethrough energizes the magnet 57 that belongs to and coöperates with the locking-latch 27 located in shifting device 19 and opposite to the rod 21. Lever 69 having been set to the desired speed indication the remaining step in the operation of selecting a particular speed is to press and release the foot-pedal 49. Upon pressing of the foot-pedal the drive-shaft portions 1, 1ᵃ are unclutched, and during the unclutching operation the cam 43 is first rotated idly to permit actual disengagement of clutch-members 54, 56, and then the cam-portion 43ᵃ strikes the link-portion 34ᵃ, whereupon the link 34 is oscillated and the rods 21, 22, are moved to perform the forward portions of their strokes, the rod 21 moving toward the left contrary to the pressure of spring 42 and the rod 22 moving simultaneously toward the right. This movement of said rods alines their notches 40 with the locking latches 27 and carries back therewith any shifting device 18 or 19 that may have been locked thereto, and unmeshes or neutralizes the gear connected to such device and locks the device with its gear firmly in neutralized state to the fixed plate 33. A pawl 74 having its engaging head 75 sufficiently wide to bear simultaneously against the edges of link-plate 34 and cam-plate 43 is hinged at 76 to casing 3 and is pressed upon by a spring 77 which compels it to normally bear against the edges of said link and cam. At the termination of the said movement of the rods 21, 22, and of the rotation and swinging of cam 43 and link 34, the engaging head 75 of pawl 74 drops into a notch 78 in link 34 and into a notch 79 in cam 43, Fig. 7, and thereby engages said link in its swung position and locks the rods 21, 22 in shifted position with the spring 42 in compressed state. Just prior to the termination of this movement of the rods 21, 22 and the alinement of their notches 40 with the latches 27, a lug 80 formed upon wing 38 of rod 21 strikes against a projection 81 of a flexible conducting terminal-bar 82 and causes it to contact with a terminal bar 83. Contacting of the terminal-bars 82, 83 conducts the current from battery 84 along wire 85, through terminal-bars 82, 83, along wire 86, plate 62, arm 60, terminal 63, wire 87, and through the solenoid 57 belonging to the latch 27 which is opposite the rod 21 in shifting device 19, where the current is grounded and returned back to the battery. Said solenoid 57 is thereby energized, and attracting its armature 58 causes its latch 27 to enter into its registering notch 40 and to lock the shifting device 19 to the rod 21. Upon the immediate releasing of the pedal 49 the shaft-portions 1, 1ª are clutched, and during the first part of the clutching operation and of the releasing movement of the pedal the cam plate 43 rotates backwardly in a counter clockwise direction, and the edge 43ᵇ of its thickened portion 43ª moves away from and clears the edge 34ᵇ of the thickened link-portion 34ª without affecting the link-plate 34. During the interval of the initial part of the rotatable stroke of cam 43 a beveled cam-portion 88 at the side of its notch 79 engages the pawl-head 75 and forces the pawl 74 out of the link-notch 78, Fig. 8, whereby said pawl and the link become disengaged and the rods 21, 22 with the compressed spring 42 are thus released. Said spring thereupon immediately actuates the rods 21, 22 and imparting a snap movement thereto moves them to simultaneously perform the backward portions of their strokes, that of the rod 21 toward the right and the rod 22 toward the left, whereupon the rod 21 carries therewith the shifting device 19 locked thereto and shifts it with its gear 13 toward the right and meshes the gears 13, 15. The actual meshing of the gears, therefore, is performed solely by the action of spring 42, which upon being released is permitted to impart the snap movement to the rods 21, 22 without any coaction of their actuating cam 43 and independent of the releasing movement or control of the pedal 49 or the operation of the clutch 2. Imparting of a snap movement to the gear as it is meshed with its coöperating gear by means of the free and uncontrolled releasing action of spring 42 is deemed desirable in meshing the gears effectively, for the reason that automatic snap-movement which is uniform as to time and power is thereby imparted to the meshing gear and combined with required resiliency, and such meshing action of the gears is conducive to reliability of changing of the speeds and durability of the gear-teeth. It may however sometimes become desirable to control the movement, or what may be termed the uncontrolled movement, of the rods 21, 22 and of the gear which is being shifted, at the moment after the spring 42 has been released. Such control may be advantageous in instances where the shifted gear has tended to clash with its coöperating gear and it is desired to reshift it, or where the coöperating gears have come in contact or have meshed partially and it is at such moment desired to neutralize or to change to a different gear selection just before the actual completion of the clutching of the engine-shaft, in order to avoid an accident or other sudden exigency occurring in the driving of the automobile. Should such control be wanted, the operator may obtain it by arresting the return movement of the pedal 49 at the proper moment, and in this manner stopping the anti-clockwise rotation of the cam 43 at an intermediate stage of its stroke and cause the edge 34ᵇ of link-portion 34ª to abut against the edge 43ᵇ of cam-portion 43ª and thereby stop the movement of the link 34 and rods 21, 22 before completion of their strokes; whereupon the pedal 49 may be pressed forward and the partially shifted gear thus brought back to neutral position, after which this gear may be again reshifted or another gear selected and shifted. While shifting the gears under all normal conditions, however, the spring 42 is first caused to be compressed during the pressing of the pedal 49 and the unclutching operation; during the releasing of the pedal and the first part of the clutching operation the spring 42 is maintained locked in compressed state and the actuating cam 43 is rotated back idly to clear the edge 34ᵇ of the link-portion 34ª; and during the termination of the clutching operation said spring is unlocked and permitted to impart the snap movement to the rods 21, 22, which thus shift the selected gear without control to mesh it with its coöperating gear. In addition to the mentioned functions of spring 42 it also serves to positively maintain the shifted gear in place and prevents accidental unmeshing thereof. After the rods 21, 22 commence to move backwardly to mesh the gears the lug 80 travels away from the projection 81 and thereby allows the terminal bar 82 to withdraw from the terminal-bar 83, whereupon the circuit energizing the said solenoid 57 is broken and no more current is utilized during the continuance of the meshing of the gears 13, 15. It will be evident that the entire above described operation, of selecting and shifting the gears, is momentarily performed, requiring on the part of the operator merely the setting of the lever 69 and pressing of the pedal 49.

Should it be desired to unmesh the gears 13, 15, and to mesh any other coöperating pair of gears such as the gears 13, 10 for low speed, the lever 69 is set to point at "1," corresponding to such selection of speed, and the pedal 49 is then pressed and released. Thereupon the rods 21, 22 are actuated and the rod 21 moves the shifting-device 19 and the gear 13 back, and thereby unmeshes the gears 13, 15 and locks the said device with the gear 13 to the plate 33 in unmeshed or neutral position. Then the circuit is closed and the current conducted from the battery 84, along wire 85, through terminal-bars 82, 83, along wire 86, plate 62, through arm 60 across gap 89, through contact 64, wire 90, and through the solenoid 57 belonging to the latch 27 opposite the rod 22 in shifting device 19, where the current is grounded and returned back to the battery. Said solenoid is thereby energized to lock the shifting device 19 to the rod 22, and thereafter the spring 42 moves the rods 21, 22 and causes the rod 22 to shift the device 19 with the gear 13 from neutral position toward the left and meshes the gears 13, 10.

It will be seen by following the circuits in the drawing, that in a similar manner setting of the lever 69 to point at "2nd" or intermediate speed and pressing of the pedal 49 will first unmesh and neutralize any coöperating pair of gears that may be meshed, the solenoid 57 belonging to the latch 27 opposite the rod 21 in shifting device 18 will be then energized and will lock said device to the rod 21, and said rod will then move and mesh the gears 12, 9. Likewise, setting of the lever 69 to point at "3rd" or highest speed and pressing of said pedal will energize the solenoid 57 belonging to latch 27 opposite rod 22 in shifting device 18 and will lock said device to the rod 22, and said rod will then move and mesh the internal gear 14 inside of gear 12 with the gear 5 for direct driving.

Should it be desired to unmesh or neutralize any coöperating pair of gears that may be meshed, without necessarily selecting any other speed or meshing any other pair of gears, the lever 69 may be set to point anywhere between any two of the speed indications upon indicator frame 71 so that the arm 60 is disposed at a place between any two of the contacts 63, 64, 65, 66, Fig. 10, whereby upon subsequently pressing of the pedal 49 any gear that may be in mesh is unmeshed and restored to locked neutral position. It will be evident that with this mechanism any predetermined selection of speed desired may be made at any time before or after the swinging of the pedal 49 to perform the clutching operation of the drive-shaft, and such speed selection may be also made at any time and stage during the clutching operation.

Variations may be resorted within the scope of the claims, and portions of the improvements may be used without others.

Having thus described my invention, I claim:—

1. In an automobile, the combination with a drive gear, and a transmission gear for driving the wheels, of means to move one of said gears without control to mesh it with the other gear, and means to control part of the entire movement of said gear contrary to the power exerted by its moving means.

2. In an automobile, the combination with a drive gear, and a transmission gear for driving the wheels, of means to move one of said gears without control to mesh it with the other gear, and means to control a part of the movement of said gear contrary to the power exerted by its moving means.

3. In an automobile, the combination with a drive gear, and a transmission gear for driving the wheels, of a shifting device for one of said gears, spring actuated means to move said device without control, and means to control a part of the entire movement of the device contrary to the power exerted by its moving means.

4. In an automobile, the combination with a drive gear, and a transmission gear for driving the wheels, of a spring to actuate one of said gears, means to move said gear contrary to the power exerted by said spring to unmesh it, said spring being permitted to move said gear without control to mesh it, and said means being adapted to control a part or the entire movement of said spring-actuated gear during the meshing operation.

5. In an automobile, the combination with a drive gear, and a transmission gear for driving the wheels, of a spring to actuate one of said gears, said spring being permitted to move said gear without control to mesh it, and means to control a part or the entire movement of said spring-actuated gear during the meshing operation.

6. In an automobile, the combination with a drive gear, and a transmission gear for driving the wheels, of a shifting device for one of said gears, a spring to actuate said device in one direction, pedal actuated means to actuate said device in the opposite direction, said spring being permitted to move said device independent of said actuating means in the opposite direction, and said actuating means being adapted to control a part or the entire movement of said device in the latter direction contrary to the power exerted by said spring.

7. In an automobile, the combination with a drive gear, and a transmission gear for driving the wheels, of a shifting device for one of said gears, a spring to actuate said device, pedal actuated means to actuate said spring contrary to its power, said spring being permitted to move said device independent of said actuating means, and said pedal actuated means being adapted to control a part or the entire movement of said device contrary to the power exerted by said spring.

8. In an automobile, the combination with a drive gear, and a transmission gear for driving the wheels, of a shifting device for one of said gears, a spring to actuate said device, pedal operated means to actuate said spring contrary to its power, said spring being permitted to move said device independent of said actuating means, and said pedal being adapted to control said actuating means to control a part or the entire movement of said device contrary to the power exerted by said spring.

9. In an automobile, the combination with a drive shaft, a driven shaft, a clutch for said shafts, a pedal for operating said clutch, a drive gear, and a transmission gear for driving the wheels, of a spring to actuate one of said gears operated by said pedal, said spring being permitted to actuate said gear independent of the control of said pedal, and means to control a part or the entire movement of said gear through the operation of said pedal.

10. In an automobile, the combination with a drive shaft, a driven shaft, means to clutch and unclutch said shafts, means to operate said clutching means, a drive gear, and a transmission gear for driving the wheels, means to mesh said gears during the clutching operation of said shaft independent of the control of said clutch operating means, and means to control a part or the entire meshing operation through the operation of said clutch operating means.

11. In an automobile, the combination with a drive shaft, a driven shaft, means to clutch and unclutch said shafts, means to operate said clutching means, a drive gear, and a transmission gear for driving the wheels, of a shifting device for one of said gears, means to move said device during the clutching operation independent of the control of said clutch-operating means, and means to control a part or the entire movement of said device contrary to the power exerted by its moving means through the operation of said clutch operating means during the clutching operation.

12. In an automobile, the combination with a drive shaft, a driven shaft, means to clutch and unclutch said shafts, means to operate said clutching means, a drive gear, and a transmission gear for driving the wheels, of a spring to actuate one of said gears operated by said clutch-operating means, said spring being permitted to actuate said gear during the clutching operation independent of the control of said clutch-operating means, and means to control a part or the entire movement of said gear contrary to the power exerted by said spring through the operation of said clutch-operating means.

13. In an automobile, the combination with a drive gear, and a transmission gear for driving the wheels, of a spring for moving one of said gears, means to lock said spring, means to unlock said spring to permit it to move said gear without control, and means to control a part or the entire movement of said gear contrary to the power exerted by said spring.

14. In an automobile, the combination with a drive gear, and a transmission gear for driving the wheels, of means to move one of said gears, means to lock said moving means, means to unlock said moving means to permit it to move said gear without control, and means to control a part or the entire movement of said gear contrary to the power exerted by said moving means.

15. In an automobile, the combination with a drive gear, and a transmission gear for driving the wheels, of a spring for moving one of said gears, means to lock said spring, said spring-actuating means actuating said locking means to unlock said spring to permit it to move said gear without control, and means to control a part or the entire movement of said gear contrary to the power exerted by said spring.

16. In an automobile, the combination with drive gears, and transmission gears for driving the wheels, of a movable member, means to lock any one of said gears to said member, means to move said member without control to mesh said locked gear, and means to control a part or the entire movement of said member and locked gear contrary to the power exerted by said moving means.

17. In an automobile, the combination with a drive shaft, a driven shaft, means to clutch and unclutch said shafts, means to operate said clutching means, drive gears, and transmission gears for driving the wheels, of a movable member, means to lock any one of said gears to said member, means to move said member independent of the control of said clutch-operating means, and means to control a part or the entire movement of said member through the operation of said clutch-operating means.

18. In an automobile, the combination with a drive shaft, a driven shaft, means to clutch and unclutch said shafts, means to operate said clutching means, a drive gear, and a transmission gear for driving the wheels, of means to move one of said gears without control upon the operation of said clutch-operating means to mesh it with the other gear, and means to control a part or the entire movement of said gear contrary to the power exerted by its moving means through the operation of said clutch-operating means.

19. In an automobile, the combination with a drive shaft, a driven shaft, means to clutch and unclutch said shafts, means to operate said clutching means, drive gears, and transmission gears for driving the wheels, of a movable member, means to lock any one of said gears to said member, a spring to move said member operated by said clutch-operating means, said spring being permitted to move said member independent of the control of said clutch-operating means, and means to control a part or the entire movement of said member through the operation of said clutch-operating means.

20. In an automobile, the combination with a drive shaft, a driven shaft, means to clutch and unclutch said shafts, means to operate said clutching means, drive gears, and transmission gears for driving the wheels, of shifting devices for said gears, a movable member, means to lock any one of said devices to said member, a spring to move said member, said spring being permitted to move said member and locked device independent of the control of said clutch-operating means to mesh the gear carried by said locked device, and means to control a part or the entire movement of said member and locked device contrary to the power exerted by said spring upon the operation of said clutch-operating means.

21. In an automobile, the combination with a drive shaft, a driven shaft, a clutch for said shafts, a pedal for operating said clutch, a drive gear, and a transmission gear for driving the wheels, of a movable member, means to lock one of said gears to said member, means to move said member to unmesh the gears by the operation of said pedal, means to move said member independent of the control of said pedal to mesh said locked gear, said unmeshing means being adapted to control a part or the entire movement of said member and the meshing operation of locked gear through the operation of said pedal.

22. In an automobile, the combination with a drive shaft, a driven shaft, a clutch for said shafts, a pedal for operating said clutch, a drive gear, and a transmission gear for driving the wheels, of a movable member, means to lock one of said gears to said member, a spring to move said member operated by said pedal, said spring being permitted to move said member independent of the control of said pedal, and means to control a part or the entire movement of said member through the operation of said pedal.

23. In an automobile, the combination with a drive shaft, a driven shaft, means to clutch and unclutch said shafts, means to operate said clutching means, drive gears, and transmission gears for driving the wheels, of a movable member, means to lock any one of said gears to said member, a spring to move said member and locked gear compressed by said clutch-operating means, said spring being permitted to move said member and gear during the clutching operation independent of the control of said clutch-operating means, and means to control a part or the entire movement of said member and gear contrary to the power exerted by said spring through the operation of said clutch-operating means.

24. In an automobile, the combination with a drive shaft, a driven shaft, clutching means for said shafts, drive gears, and transmission gears for driving the wheels, of a movable member, means to lock any one of said gears to said member, means to move said member, said member being permitted to move and said locked gear being permitted to mesh during the operation of said clutching means independent of the control of said moving means, and means to control a part or the entire movement of said member and gear during the meshing operation contrary to the power exerted by said moving means.

25. In an automobile, the combination with drive gears, and transmission gears for driving the wheels, of a movable member, means to lock any one of said gears to said member, a spring for moving said member, means to actuate said spring, means to lock said spring in actuated state, means to unlock said spring to permit it to move said member independent of the control of said actuating means, and said spring actuating means being adapted to control a part or the entire movement of said member contrary to the power exerted by said spring.

26. In an automobile, the combination with a drive shaft, a driven shaft, clutching means for said shafts, a drive gear, and a transmission gear for driving the wheels, of a spring for moving one of said gears, means to lock said spring during the unclutching operation, means to unlock said spring prior to the termination of the clutching operation to permit it to move said gear independent of control, and means to control a part or the entire movement of said gear contrary to the power exerted by said spring.

27. In an automobile, the combination with drive gears, and transmission gears for driving the wheels, of movable members, means to lock any one of said gears to any one of said members, means to move said members in opposite directions without control to mesh said locked gear, said means being adapted to control a part or the entire movement of said members and locked gear contrary to the power exerted by said moving means.

28. In an automobile, the combination with drive gears, and transmission gears for driving the wheels, of movable members, means to lock any one of said gears to any one of said members, a spring for moving said members, said spring being permitted to move said members independent of the control of said moving means, and means to control a part or the entire movement of said members contrary to the power exerted by said spring.

29. In an automobile, the combination with a drive shaft, a driven shaft, means to clutch and unclutch said shafts, means to operate said clutching means, drive gears, and transmission gears for driving the wheels, of movable members, means to lock any one of said gears to any one of said members, means to move said members in opposite directions operated by said clutch-operating means, and means to move said members independent of the control of said clutch-operating means.

30. In an automobile, the combination with a drive shaft, a driven shaft, means to clutch and unclutch said shafts, means to operate said clutching means, drive gears, and transmission gears for driving the wheels, of movable members, means to lock any one of said gears to any one of said members, a spring to move said members in opposite directions operated by said clutch-operating means, and means to control a part or the entire movement of said members through the operation of said clutch-operating means.

31. In an automobile, the combination with a drive shaft, a driven shaft, a clutch for said shafts, a pedal for operating said clutch, a drive gear, and a transmission gear for driving the wheels, of movable members, means to lock one of said gears to any one of said members, means to move said members by the operation of said pedal, means to move said members independent of the control of said pedal to mesh said locked gear, said pedal operating means being adapted to control a part or the entire movement of said members and the meshing operation of locked gear through the operation of said pedal.

32. In an automobile, the combination with a drive shaft, a driven shaft, a clutch for said shafts, a pedal for operating said clutch, a drive gear, and a transmission gear for driving the wheels, of movable members, means to lock one of said gears to any one of said members, a spring to move said members operated by said pedal, said spring being permitted to move said members independent of the control of said pedal, and means to control a part or the entire movement of said members through the operation of said pedal.

33. In an automobile, the combination with a drive shaft, a driven shaft, means to clutch and unclutch said shafts, means to operate said clutching means, drive gears, and transmission gears for driving the wheels, of movable members, means to lock any one of said gears to any one of said members, means to move said members in opposite directions and mesh said locked gear controlled by said clutch-operating means, and means to control a part or the entire movement of said members and meshing operation through the operation of said clutch-operating means.

34. In an automobile, the combination with a drive shaft, a driven shaft, means to clutch and unclutch said shafts, means to operate said clutching means, drive gears, and transmission gears for driving the wheels, of movable members, means to lock any one of said gears to any one of said members, a spring to move said members and locked gear operated by said clutch-operating means, said spring being permitted to move said members and gear during the clutching operation independent of the control of said clutch-operating means, and means to control a part or the entire movement of said members and gear contrary to the power exerted by said spring through the operation of said clutch-operating means.

35. In an automobile, the combination with a drive shaft, a driven shaft, clutching means for said shafts, drive gears, and transmission gears for driving the wheels, of movable members, means to lock any one of said gears to any one of said members, means to move said members in opposite directions and to mesh said locked gear during the operation of said clutching means independent of the control of said moving means, and means to control a part or the entire movement of said members and gear during the meshing operation contrary to the power exerted by said moving means.

36. In an automobile, the combination with a drive shaft, a driven shaft, clutching means for said shafts, a drive gear, and a transmission gear for driving the wheels, of means to move one of said gears without control to contact it with the other gear during the operation of said clutching means and to return said gear to initial position before the completion of the clutching of said shaft.

37. In an automobile, the combination with a drive shaft, a driven shaft, a clutch for said shafts, means to operate said clutch, drive gears, and transmission gears for driving the wheels, of means to move any one of said gears without control upon the operation of said clutch-operating means to mesh it with one of the other gears, and means to arrest the movement of said gear before completed meshing thereof and to return it to initial position before the completion of the clutching of said shaft.

38. In an automobile, the combination with a drive shaft, a driven shaft, a clutch for said shafts, means to operate said clutch, drive gears, and transmission gears for driving the wheels, of a spring for moving any one of said gears, means to free said spring upon the operation of said clutch-operating means to permit it to move said gear without control to mesh it with any one of the other gears, and means to arrest said gear contrary to the power exerted by said spring before completed meshing thereof and to return it to initial position before the completion of the clutching of said shaft.

39. In an automobile, the combination with a drive shaft, a driven shaft, a clutch for said shafts, means to operate said clutch, drive gears, and transmission gears for driving the wheels, of a movable member, means to lock any one of said gears to said member, means to move said member without control upon the operation of said clutch-operating means to mesh said locked gear, and means to arrest the movement of said member before completed meshing of said gear and to return the member to initial position before the completion of the clutching of said shaft.

40. In an automobile, the combination with a drive shaft, a driven shaft, a clutch for said shafts, means to operate said clutch, drive gears, and transmission gears for driving the wheels, of movable members, means to lock any one of said gears to any one of said members, means to move said members in opposite directions without control upon the operation of said clutch-operating means to mesh said locked gear, and means to arrest the movement of said members before completed meshing of said gear and to return the members to initial position before the completion of the clutching of said shaft.

41. In an automobile, the combination with drive gears, and transmission gears for driving the wheels, of a shifting device for each coöperating pair of said gears, means to select any one of said devices, means to move said selected device independent of control, and means to control a part or the entire movement of said device before completion of its uncontrolled movement.

42. In an automobile, the combination with drive gears, and transmission gears for driving the wheels, of means to select any one of said gears, means to move said selected gear independent of control, and means to control a part or the entire movement of said gear before completion of its uncontrolled movement.

43. In an automobile, the combination with drive gears, and transmission gears for driving the wheels, of means to select any one of said gears, a spring to move said selected gear independent of control, and means to control a part or the entire movement of said gear before completion of its uncontrolled movement contrary to the power exerted by said spring.

44. In an automobile, the combination with a drive shaft, a driven shaft, clutching mechanism for said shafts, drive gears, and transmission gears for driving the wheels, of means to operate said clutching mechanism, means to select any one of said gears at any stage of the operation of said mechanism, means to move said selected gear independent of control during the operation of said mechanism, and means to control a part or the entire movement of said gear before completion of its uncontrolled movement.

45. In an automobile, the combination with a drive shaft, a driven shaft, clutching mechanism for said shafts, drive gears, and transmission gears for driving the wheels, of means to operate said clutching mechanism, means to select any one of said gears in any position of said mechanism, means to move said selected gear independent of control, and means to control a part or the entire movement of said gear before completion of its uncontrolled movement.

46. In an automobile, the combination with a drive shaft, a driven shaft, a clutch for said shafts, a pedal for operating said clutch, drive gears, and transmission gears for driving the wheels, of means to select any one of said gears in any position of said pedal, means to move said selected gear independent of control, and means to control a part or the entire movement of said gear before completion of its uncontrolled movement.

47. In an automobile, the combination with a drive shaft, a driven shaft, a clutch for said shafts, a pedal for operating said clutch, drive gears and transmission gears for driving the wheels, of means to select any one of said gears in any position of said pedal, an actuating spring for moving said selected gear independent of the control of said pedal, and means to control a part of the movement of said gear through the operation of said pedal before completion of the uncontrolled movement of the gear.

48. In an automobile, the combination with a drive shaft, a driven shaft, clutching mechanism for said shafts, drive gears, and transmission gears for driving the wheels, of means to operate said clutching mechanism, means to select any one of said gears in any position of said mechanism, a spring to move said selected gear independent of control, and means to control a part of the movement of said gear before completion of its uncontrolled movement contrary to the power exerted by said spring.

49. In an automobile, the combination with a drive shaft, a driven shaft, clutching mechanism for said shafts, drive gears, and transmission gears for driving the wheels, of means to operate said clutching mechanism, a movable member, means to select any one of said gears in any position of said mechanism for locking it to said member, means to move said member and locked gear independent of control, and means to control a part or the entire movement of said member and locked gear before completion of their uncontrolled movement, 50. In an automobile, the combination with a drive shaft, a driven shaft, clutching mechanism for said shafts, drive gears, and transmission gears for driving the wheels, of means to operate said clutching mechanism, movable members, means to select any one of said gears in any position of said mechanism for locking it to any one of said members, means to move said members and locked gear independent of control, and means to control a part or the entire movement of said members and locked gear before completion of their uncontrolled movement.

51. In an automobile, the combination with a drive shaft, a driven shaft, clutching mechanism for said shafts, drive gears, and transmission gears for driving the wheels, of means to operate said clutching mechanism, means released through operation of said clutching mechanism to move one of said gears without control to mesh it with its cooperating gear, means to arrest the movement of said gear and to return it to initial position, and means to select any other of said gears for meshing upon the return of said former gear.

52. In an automobile, the combination with a drive shaft, a driven shaft, clutching mechanism for said shafts, drive gears, and transmission gears for driving the wheels, of means to operate said clutching mechanism, a movable member, means to lock any one of said gears to said member, means to move said member and locked gear independent of control to mesh it with its cooperating gear, means to arrest the movement of said member and locked gear and return them to initial position, and means to select any other of said gears upon return of said former gear for locking it to said member.

53. In an automobile, the combination with a drive shaft, a driven shaft, a clutch for said shafts, a pedal for operating said clutch, drive gears, and transmission gears for driving the wheels, of means to move any one of said gears by the operation of said pedal, means to move said gear independent of the control of said pedal, and means to control a part of the movement of said gear through the operation of said pedal before completion of the uncontrolled movement of the gear.

54. In an automobile, the combination with a drive shaft, a driven shaft, clutching mechanism for said shafts, drive gears, and transmission gears for driving the wheels, of means to operate said clutching mechanism, means to move any one of said gears by the operation of said mechanism, said means being adapted to permit movement of said gear independent of the control of said mechanism, and to control a part or the entire movement of said gear before completion of its uncontrolled movement.

55. In an automobile, the combination with a drive shaft, a driven shaft, clutching mechanism for said shafts, drive gears, and transmission gears for driving the wheels, of means to operate said clutching mechanism, means including a spring to move any one of said gears by the operation of said mechanism, independent of the control of said mechanism, and means to control a part or the entire movement of said gear before completion of its uncontrolled movement contrary to the power exerted by said spring.

56. In an automobile, the combination with a drive shaft, a driven shaft, clutching mechanism for said shafts, drive gears, and transmission gears for driving the wheels, of means to operate said clutching mechanism, a movable member, means to lock any one of said gears to said member, means to move said member and locked gear by the operation of said mechanism, said means being adapted to permit movement of said member and gear independent of the control of said mechanism, and to control a part of the movement of said member and gear before completion of their uncontrolled movement.

57. In an automobile, the combination with a drive shaft, a driven shaft, clutching mechanism for said shafts, drive gears, and transmission gears for driving the wheels, of means to operate said clutching mechanism, movable members, means to lock any one of said gears to any one of said members, means to move said members and locked gear by the operation of said mechanism, said means including means to permit movement of said members and gear independent of the control of said mechanism, and to control a part of the movement of said members and gear before completion of their uncontrolled movement.

58. In an automobile, the combination with drive gears, and transmission gears for driving the wheels, of a movable member, means to lock any one of said gears to said member, means to move said member to mesh with the gear, and means to control a part of the movement of said member and locked gear contrary to the power exerted by said moving means to return the gear to unmeshed position.

59. In an automobile, the combination with drive gears, and transmission gears for driving the wheels, of movable members, means to lock any one of said gears to any one of said members, means to move said members to mesh the gear, and means to control the movement of said members to unmesh said locked gear, said means serving also to control a part of the movement of said members and locked gear contrary to the power exerted by the meshing means to return the gear to unmeshed position.

60. In an automobile, the combination with drive gears, and transmission gears for driving the wheels, of movable members, means to lock any one of said gears to any one of said members, a spring for moving said members, means to control the movement of said members to unmesh said locked gear and to compress said spring, said spring being permitted to move said members without control to mesh another of said locked gears, and said controlling means being adapted to control a part of the movement of said members and locked gear contrary to the power exerted by said spring and to return the gear to unmeshed position.

61. In an automobile, the combination with drive gears, and transmission gears for driving the wheels, of members adapted to move parallel to each other and in directions opposite to each other, means to lock any one of said gears to any one of said members, and means to move said members by a movement for meshing independent of the action of the means for unmeshing.

62. In an automobile, the combination with drive gears, and transmission gears for driving the wheels, of movable members, means to lock any one of said gears to any one of said members by locks for said gears respectively mounted and operated independently of one another, means to actuate said members, and means connecting said members whereby they will move in synchronism when actuated.

63. In an automobile, the combination with drive gears, and transmission gears for driving the wheels, of synchronously movable members, means to lock any one of said gears to any one of said members, and a spring for actuating said members for meshing by an action independent of the means used for unmeshing.

64. In an automobile, the combination with drive gears, and transmission gears for driving the wheels, of members adapted to move parallel to each other and in directions opposite to each other, means to lock any one of said gears to any one of said members, a lever joining said members, and a spring acting against one of said members to move both members.

65. In an automobile, the combination with drive gears, and transmission gears for driving the wheels, of shifting arms for said gears, movable members passing through each of said arms, means to lock any one of said arms to any one of said members, and means to move said members.

66. In an automobile, the combination with drive gears, and transmission gears for driving the wheels, of shifting arms for said gears, rods adapted to move parallel to each other and in opposite directions passing through each of said arms, means to lock any one of said arms to any one of said rods, and means to move said rods.

67. In an automobile, the combination with drive gears, and transmission gears for driving the wheels, of shifting arms for said gears, movable members passing through each of said arms, a locking device carried by each of said arms for locking it to any one of said members, and means to move said members.

68. In an automobile, the combination with drive gears, and transmission gears for driving the wheels, of shifting arms for said gears, rods adapted to move parallel to each other and in opposite directions passing through each of said arms, a locking latch carried by each of said arms for locking any one of the arms to any one of said rods, and means to move said rods.

69. In an automobile, the combination with drive gears, and transmission gears for driving the wheels, of shifting arms for said gears, movable members passing through each of said arms, means to lock any one of said arms to any one of said members, means to actuate said members, and means connecting said members whereby they will move in synchronism when actuated.

70. In an automobile, the combination with drive gears, and transmission gears for driving the wheels, of shifting arms for said gears, rods adapted to move parallel to each other and in opposite directions passing through each of said arms, means to lock any one of said arms to any one of said rods, means to actuate said rods, and a lever joining said members to cause them to move synchronously when actuated.

71. In an automobile, the combination with drive gears, and transmission gears for driving the wheels, of shifting arms for said gears, movable members passing through each of said arms, a locking device carried by each of said arms for locking it to any one of said members, means to actuate said members, and means connecting said members whereby they will move in synchronism when actuated.

72. In an automobile, the combination with drive gears, and transmission gears for driving the wheels, of movable members, means to lock any one of said gears to any one of said members, a spring acting directly on said members, and means connecting said members whereby they will move in synchronism when actuated, 73. In an automobile, the combination with drive gears, and transmission gears for driving the wheels, of shifting arms for said gears, movable members passing through each of said arms, means to lock any one of said arms to any one of said members, and a spring for moving said members.

74. In an automobile, the combination with drive gears, and transmission gears for driving the wheels, of shifting arms for said gears, movable members passing through each of said arms, a locking device carried by each of said arms for locking it to any one of said members, means connecting said members whereby they will move in synchronism when actuated, and a spring for actuating said members.

75. In an automobile, the combination with drive gears and transmission gears for driving the wheels, of movable members, means to lock any one of said gears to any one of said members, and a spring acting directly on said members.

76. In an automobile, the combination with a drive shaft, a driven shaft, means to clutch and unclutch said shafts, means to operate said clutching means, drive gears, and transmission gears for driving the wheels, of movable members, means to lock any one of said gears to any one of said members, and means to move said members by the operation of said clutch operating means in one direction and means for moving said members in the other direction independently of the clutch operating means.

77. In an automobile, the combination with a drive shaft, a driven shaft, means to clutch and unclutch said shafts, means to operate said clutching means, drive gears, and transmission gears for driving the wheels, of movable members, means to lock any one of said gears to any one of said members, and means to move said members during the clutching operation of said shaft but independently thereof.

78. In an automobile, the combination with a drive shaft, a driven shaft, means to clutch and unclutch said shafts, a pedal for operating said clutching means, drive gears, and transmission gears for driving the wheels, of movable members, means to lock any one of said gears to any one of said members, and means controllable by the pedal but adapted to act independently thereof to move said members and mesh said locked gear.

79. In an automobile, the combination with a drive shaft, a driven shaft, means to clutch and unclutch said shafts, means to operate said clutching means, drive gears, and transmission gears for driving the wheels, of movable members, means to lock any one of said gears to any one of said members, means connecting said members whereby they will move in synchronism when actuated, and means to move said members by the operation of said clutch operating means.

80. In an automobile, the combination with a drive shaft, a driven shaft, means to clutch and unclutch said shafts, means to operate said clutching means, drive gears, and transmission gears for driving the wheels, of shifting arms for said gears, movable members passing through each of said arms, means to lock any one of said arms to any one of said members, and means to move said members by the operation of said clutch operating means.

81. In an automobile, the combination with a drive shaft, a driven shaft, means to clutch and unclutch said shafts, means to operate said clutching means, drive gears, and transmission gears for driving the wheels, of shifting arms for said gears, movable members passing through each of said arms, a locking device carried by each of said arms for locking it to any one of said members, and means to move said members by the operation of said clutch operating means.

82. In an automobile, the combination with drive gears, and transmission gears for driving the wheels, of movable members, means to lock any one of said gears to any one of said members, a spring for moving said members, means to move said members and actuate said spring, and said spring being permitted to move said members in an opposite direction independent of the control of said spring-actuating means.

83. In an automobile, the combination with a drive shaft, a driven shaft, means to clutch and unclutch said shafts, means to operate said clutching means, drive gears, and transmission gears for driving the wheels, of movable members, means to lock any one of said gears to any one of said members, a spring for moving said members, means to move said members and actuate said spring operated by said clutch operating means, and said spring being permitted to move said members in an opposite direction independent of the control of said clutch-operating means.

84. In an automobile, the combination with a drive shaft, a driven shaft, means to clutch and unclutch said shafts, means to operate said clutching means, drive gears, and transmission gears for driving the wheels, of movable members, means to lock any one of said gears to any one of said members, a spring for moving said members, means to move said members and actuate said spring operated by said clutch operating means, and said spring being permitted to move said members during the clutching operation of said shaft independent of the control of said clutch-operating means.

85. In an automobile, the combination with drive gears, and transmission gears for driving the wheels, of movable members, means to lock any one of said gears to any one of said members, an actuating member for said movable members, and means to move said actuating member partially independently and partially together with said movable members while the gears are locked to said members.

86. In an automobile, the combination with drive gears, and transmission gears for driving the wheels, of movable members, means to lock any one of said gears to any one of said members, an actuating member for said movable members, means to move said actuating member partially independently and partially together with said movable members, and means to actuate said movable members independent of the movement of said actuating member.

87. In an automobile, the combination with drive gears, and transmission gears for driving the wheels, of movable members, means to lock any one of said gears to any one of said members, a spring for moving said members, a pivoted lever joining said members, an actuating member for said lever, means to operate said actuating member to move said members and compress said spring, and means to operate said actuating member to release said lever to permit said spring to move said members independent of control.

88. In an automobile, the combination with drive gears, and transmission gears for driving the wheels, of movable members, means to lock any one of said gears to any one of said members, a pivoted lever joining said members, a pivoted cam to actuate said lever and move said members partially independently and partially together with the cam, and means to actuate said cam.

89. In an automobile, the combination with drive gears, and transmission gears for driving the wheels, of movable members, means to lock any one of said gears to any one of said members, a pivoted lever joining said members, a pivoted cam acting on said lever, means to operate said cam in opposite directions, and said cam when operated in one direction being actuated partially independently and then together with said lever and members and when operated in an opposite direction being actuated partially independently and then together with said lever and members.

90. In an automobile, the combination with drive gears, and transmission gears for driving the wheels, of movable members, means to lock any one of said gears to any one of said members, a spring for moving said members, a pivoted lever joining said members, a pivoted cam acting on said lever, means to operate said cam, and said cam when operated in one direction being actuated partially independently and then together with said lever to move said members and compress said spring and when operated oppositely to release said lever and permit said spring to move said members independent of control.

91. In an automobile, the combination with drive gears, and transmission gears for driving the wheels, of a movable member, means to lock any one of said gears to said member, a pivoted lever connected to said member, a pivoted cam to actuate said lever and move said member partially independently and partially together with said cam, and means to operate said cam.

92. In an automobile, the combination with drive gears, and transmission gears for driving the wheels, of a movable member, means to lock any one of said gears to said member, a spring for moving said member, a pivoted lever connected to said member, a pivoted cam for actuating said lever, means to operate said cam to move said member and compress said spring, and to release said lever to permit said spring to move said members independent of control.

93. In an automobile, the combination with drive gears, and transmission gears for driving the wheels, of a movable member, means to lock any one of said gears to said member, a spring for moving said member, a pivoted cam for actuating said member, and said cam when operated moving said member and compressing said spring and then releasing said member to permit said spring to move the member.

94. In an automobile, the combination with drive gears, and transmission gears for driving the wheels, of a movable member, means to lock any one of said gears to said member, a spring for moving said member, a pivoted cam for actuating said member, and said cam when operated moving said member and compressing said spring and then releasing said member to permit said spring to move said member independent of control.

95. In an automobile, the combination with drive gears, and transmission gears for driving the wheels, of a movable member, means to lock any one of said gears to said member, and a pivoted cam adapted to be actuated partially independently and partially together with said member.

96. In an automobile, the combination with drive gears, and transmission gears for driving the wheels, of movable members, means to lock any one of said gears to any one of said members, a spring for moving said members, a pivoted lever joining said members, means to actuate said lever to move said members and compress said spring, means to lock said lever in actuated state, and means to unlock said lever to permit said spring to move said members independent of control of said actuating means.

97. In an automobile, the combination with drive gears, and transmission gears for driving the wheels, of movable members, means to lock any one of said gears to any one of said members, a spring for moving said members, a pivoted lever joining said members, a pivoted cam to actuate said lever to move said members and compress said spring, means to lock said lever in actuated state, and said cam unlocking said lever to permit said spring to move said members independent of control.

98. In an automobile, the combination with drive gears, and transmission gears for driving the wheels, of a movable member, means to lock any one of said gears to said member, a pivoted cam to actuate said member, means to lock said member when actuated, a spring for moving said member, and means to unlock said member to permit said spring to move said member independent of control.

99. In an automobile, the combination with drive gears, and transmission gears for driving the wheels, of movable members, means to lock any one of said gears to any one of said members, a spring for moving said members, a pivoted lever joining said members, a pivoted cam to actuate said lever to move said members and compress said spring, a pawl locking said lever when actuated, and said cam releasing said pawl and lever to permit said spring to move said members independent of control.

100. In an automobile, the combination with drive gears, and transmission gears for driving the wheels, of shifting devices for said gears, movable members, means to move said members, means to lock any one of said devices to any one of said members, a circuit for each of said devices having means to operate said locking means to lock said device to said members, means to close any one of said circuits, and said members when moved actuating said closing means to close and break said circuit.

101. In an automobile, the combination with drive gears, and transmission gears for driving the wheels, of shifting devices for said gears, movable members, means to move said members, means to lock any one of said devices to any one of said members, a circuit for each of said devices having means to operate said locking means to lock said device to said members, and means to close and break any one of said circuits through the medium of the movement of said members.

102. In an automobile, the combination with drive gears, and transmission gears for driving the wheels, of shifting devices for said gears, movable members, means to move said members, means to lock any one of said devices to any one of said members, a circuit for each of said devices having means to operate said locking means to lock said device to said members, and said members when moved causing any one of said circuits to close to lock its device thereto and breaking the circuit upon the shifting of the device therewith.

103. In an automobile, the combination with driving means, a drive shaft, and sets of elements for transmitting variable speeds to said shaft, of means to select any one of said sets to drive said shaft, means to cause said selected set to operate independent of control to convert it into driving relation with said shaft, and means to control a part of the operation of said selected set contrary to the power exerted by its operating means.

Signed at the city of New York, in the county of New York, and State of New York, this 29th day of November A. D. 1915.

MERION J. HUGGINS.

Witnesses:
CHAS. W. LA RUE,
B. ROMAN.